April 13, 1965

H. V. HANSEN 3,177,829

PLANTER

Filed Oct. 7, 1963

INVENTOR.
HAROLD V. HANSEN
BY

ATTORNEY

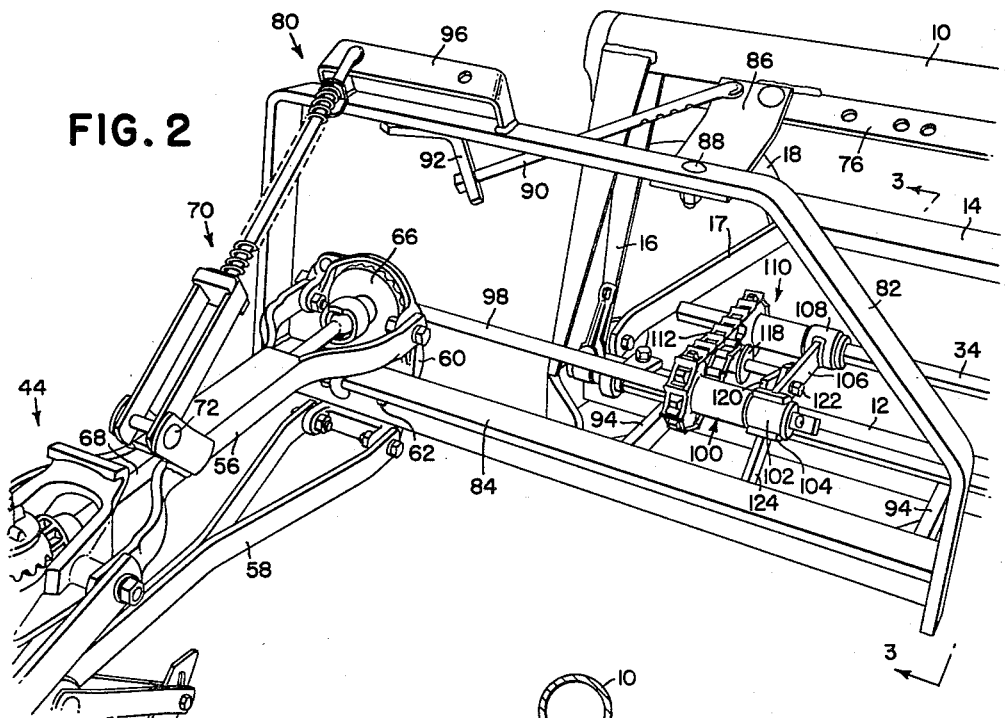
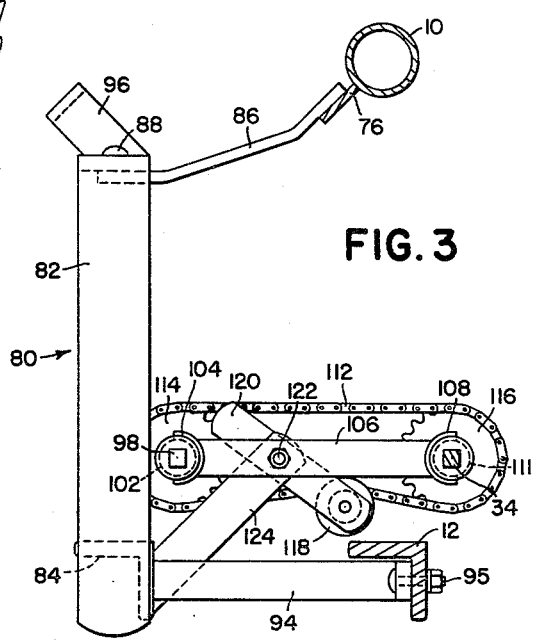
INVENTOR.
HAROLD V. HANSEN
BY
ATTORNEY

United States Patent Office 3,177,829
Patented Apr. 13, 1965

3,177,829
PLANTER
Harold V. Hansen, Hillsdale, Ill., assignor to Deere & Company, Moline, Ill., a corporation of Delaware
Filed Oct. 7, 1963, Ser. No. 314,377
2 Claims. (Cl. 111—52)

The present invention relates generally to agricultural implements, and more particularly to attachments for planters whereby additional planter units may be carried by a planter.

The object and general nature of the present invention is the provision of end extension units which may be secured to a planter frame, the end extensions receiving conventional planting units whereby the planter frame can carry additional planter units.

More particularly it is an object of the present invention to provide for a planter having a sill bar to which individual planting units may be secured and a drill shaft for driving said individual planting units, an extension frame which may be secured to said planter frame, the extension frame including a sill bar and a drill shaft to which a conventional planter unit may be secured, and means to drivingly interconnect the drill shaft on the planter with the drill shaft on the extension frame.

These and other objects and advantages of this invention will be apparent to those skilled in the art after a consideration of the following detailed description, taken in conjunction with the accompanying drawings in which the preferred form of this invention is illustrated.

FIG. 2 is an enlarged perspective view of the end extension secured to a planter frame, and a portion of a planter unit mounted on the end extension.

FIG. 3 is a sectional view taken along the line 3—3 in FIG. 2 showing the manner in which it is secured to the main frame pipe, the sill bar and drill shaft of the planter frame.

Figure 1:
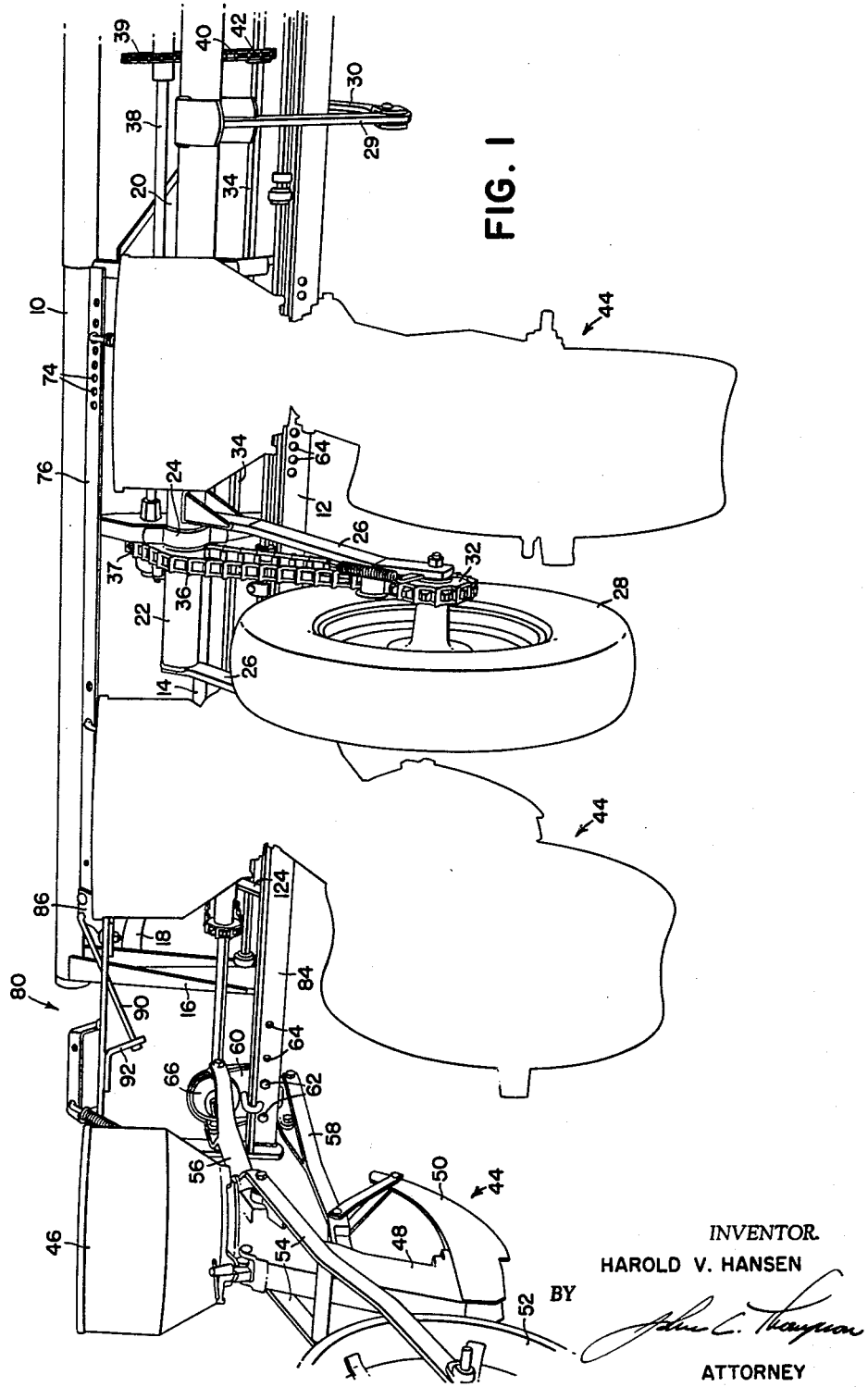
FIG. 1 is a fragmentary perspective view of a planter frame to which has been secured the end extension of the present invention, the planter frame and end extension being equipped with conventional planting units.

The end extension is adapted to be mounted on a conventional planter, such as the type shown in U.S. Patent 3,038,425 which issued June 12, 1962 to H. V. Hansen, and also shown in U.S. Patent 3,059,705 which issued October 23, 1962 to W. P. Oehler et al. As can best be seen from FIG. 1 the conventional planter includes a main frame pipe 10, a sill bar 12 and a front frame 14, these parts being interconnected at their outer ends by triangularly disposed brace members 16, 17 and 18 and at their inner portions by the forwardly extending draft frame 20. A rock shaft 22 is carried by bearings 24 which are secured to the pipe 10 and sill bar 12, the shaft carrying rock arms 26 that in turn carry ground-engaging wheel means 28. An arm 29 is connected to the central portion of the rock shaft 22 and extends generally downwardly and receives a fore-and-aft extending link 30. By extending and retracting the link 30, as by a hydraulic cylinder (not shown) carried by the draft frame 20, the rock shaft 22 can be rotated thus raising and lowering the planter frame.

Secured for rotation with the wheel means 28 is a sprocket 32 that drives the drill shaft 34 through means of the chain 36, sprocket 37, shaft 38, sprocket 39, second chain 40, and another sprocket 42.

Secured to the sill bar 12 is a plurality of planter units, indicated generally at 44, each of which includes a seed can 46, a boot 48 which includes an opener 50, a press wheel 52, links 54 which pivotally secure the press wheel to the boot 48, and forwardly extending generally parallel upper and lower links 56 and 58 respectively. The forward ends of the upper and lower parallel links of the planter units are pivotally secured to bracket 60 which can be adjustably positioned along the sill bar 12 by disposing the bolts 62 in the appropriate apertures 64 on the sill bar 12. Mounted on the bracket 60 is gearing means 66 which is adapted to drive the planter through a rotatable shaft 68. Down pressure is applied to the planting unit by means of the adjustable spring biasing link 70 which is pivotally secured at its lower end to the planter unit by means of pivot bolt 72, the upper end of the link being normally received in one of the apertures 74 in the strap 76 which is rigidly secured to the main frame pipe 10. The foregoing structure is more fully described in the foregoing patents and the reader is referred thereto for a further description of those planters with which the present invention is adapted to be used if he so desires.

The planter described above is generally designed for planting in 30″, 32″, 34″, 36″, 38″ and 40″ rows. However, when planting such crops as soy beans when 30″ spacing is used, it is desirable to provide additional narrow row planting capacity. According to the principles of this invention this may be done by providing extension planting units and converting the customary four-row planter to a six-row planter. Towards this end two extension planting units are provided for each planter, one extension unit being disposed to the right side of the planter frame and the other extension unit being disposed to the left side of the planter frame. The extension planting units include a conventional planter unit 44 and an extension frame indicated generally at 80. While only the left side of a planter and a left-hand extension planting unit has been illustrated in the drawings, it should be obvious that the planter extension unit for the right-hand side will be substantially a mirror image of the one illustrated.

Each extension frame includes a generally trapezoidal frame 82 (FIG. 2), in which the lower generally horizontal frame member 84 has substantially the same configuration as the sill bar 12 of the planter, the lower member 84 serving to receive the bracket 60 of the extension planter unit 44. Extending forwardly from the frame 82 is an upper strap 86 which is adapted to be secured to the frame strap 76 at its upper end, its lower end being secured in a conventional manner to the trapezoidal frame by means of, for example, a bolt 88. A reinforcing rod 90 extends from the upper edge of the upper strap 86 to an anchor member 92 mounted on the frame 82. Two forwardly extending members 94 (FIGS. 2 and 3) are bolted at their forward ends to the sill bar 12 of the planter, as by bolts 95, and are welded at their rearward ends to the sill bar 84 of the extension frame. Secured to the rectangular framework above the anchor strap 92 is a bracket member 96 which is suitably apertured to receive the adjustable spring biasing link 70 of the planter unit. In order to drivingly interconnect the extension planter unit with the drill shaft 34 of the planter an extension unit drill shaft 98 is provided which is adapted to be secured at its outer end to the gearing means 66 of the planter unit. The other end of the drill shaft 98 carries a combination sprocket and bearing member 100, the bearing portion 102 being disposed within a semi-cylindrical sleeve member 104, the sleeve member 104 being carried in turn by a bar member 106 to which at the other end is secured a second semi-cylindrical sleeve member 108. Nonrotatably carried on the drill shaft 34 of the planter is a sprocket and bearing member 110 which is substantially identical with the sprocket and bearing member 100. A chain 112 is disposed over the sprockets 114 and 116 on the members 100 and 110, respectively, and is held to its proper tension by an idler roller 118. The idler 118 is carried by an arm 120 which is swingably secured about pivot bolt 122 to an upwardly extending arm 124 which is rigidly secured, as by welding, to the sill bar 84. As can best be seen from FIGS. 2 and 3, the arm 124 is disposed between the arm 120 and the bar 106, which is also secured to the arm 124 by the pivot bolt 122.

In operation, when it is desired to convert the planter from a four-row planter to a six-row planter having narrow row spacing, the planter units 44 which are normally mounted on the main planter frame are moved to their narrow row spacing. The drive sprocket and bearing member 110 is then slipped onto the drill shaft 34, the extension frame unit 80 is then positioned in the manner shown in FIG. 2, the chain 112 is disposed over the sprockets 114 and 116, the bearing members 102 and 111 are engaged by the bearing portions 104 and 108 carried by the opposite ends of the bar 106, and the forwardly extending members 94 and the upper strap 86 and rod 90 are then secured to the planter frame in the manner fully set forth above. The extension planter unit is carried on the extension frame in the same manner as the planter units are carried by the regular planter frame. In the planting operation, the planter unit will be driven through the drill shaft 34, the sprockets and chains 112, 114, 116, the extension unit drill shaft 98 and the gearing means 66 of the extension planter unit.

While I have shown and described above the preferred structure in which the principles of the present invention have been incorporated, it is to be understood that my invention is not to be limited to the particular details, shown and described above, but that, in fact, widely different means may be employed in the practice of the broader aspects of the invention.

I claim:

1. A planter comprising: a draft frame, a transversely extending planter unit carrying frame rigidly secured to a rear portion of said draft frame, said carrying frame having a lower sill bar and an upper support, a drill shaft on said carrying frame, a plurality of planter units including lower attaching means and upper spring link means, means on said lower sill bar and upper support for receiving said lower attaching means and said upper spring link means, respectively, in various positions of adjustment whereby said planter units may be mounted on outer portions of said receiving means in wide row spacings and on inner portions of said receiving means in narrow row spacings, said planter units being mounted on said receiving means in narrow row spacing and drivingly interconnected with said drill shaft, the combination therewith of an auxiliary carrying frame means to which additional planter units are secured, said additional planter units including lower attaching means and upper spring link means, said auxiliary carrying frame means being mounted on opposite outer portions of said receiving means, each of said auxiliary carrying frame means including an extension sill bar and an auxiliary upper support means, said lower attaching means of an additional planter unit being secured to the extension sill bar and one end of a spring link of an additional planter unit being secured to the auxiliary upper support means, an auxiliary drill shaft carried for rotation on said auxiliary carrying frame, and drive means drivingly interconnecting said drill shaft on the planter and said auxiliary drill shaft on said auxiliary carrying frame, and means drivingly interconnecting the additional planter units mounted on said auxiliary carrying frame with said auxiliary drive shaft.

2. The invention set forth in claim 1 in which the drive means for drivingly interconnecting said drill shaft on the planter and said auxiliary drill shaft on said auxiliary carrying frame includes a sprocket and bearing member slidably non-rotatably disposed about each of said drill shafts, drive chain means disposed over said sprockets, and arm means carried by said auxiliary carrying frame and engageable with the bearing portion of each of said last-mentioned members to hold said members from sliding movement on said drill shafts.

References Cited by the Examiner
UNITED STATES PATENTS

| | | | |
|---|---|---|---|
| 842,073 | 1/07 | Browning | 111—69 X |
| 1,821,009 | 9/31 | Draper | 111—57 |
| 3,038,425 | 6/62 | Hansen | 111—34 |

ABRAHAM G. STONE, *Primary Examiner.*

WILLIAM A. SMITH, III, *Examiner.*